UNITED STATES PATENT OFFICE.

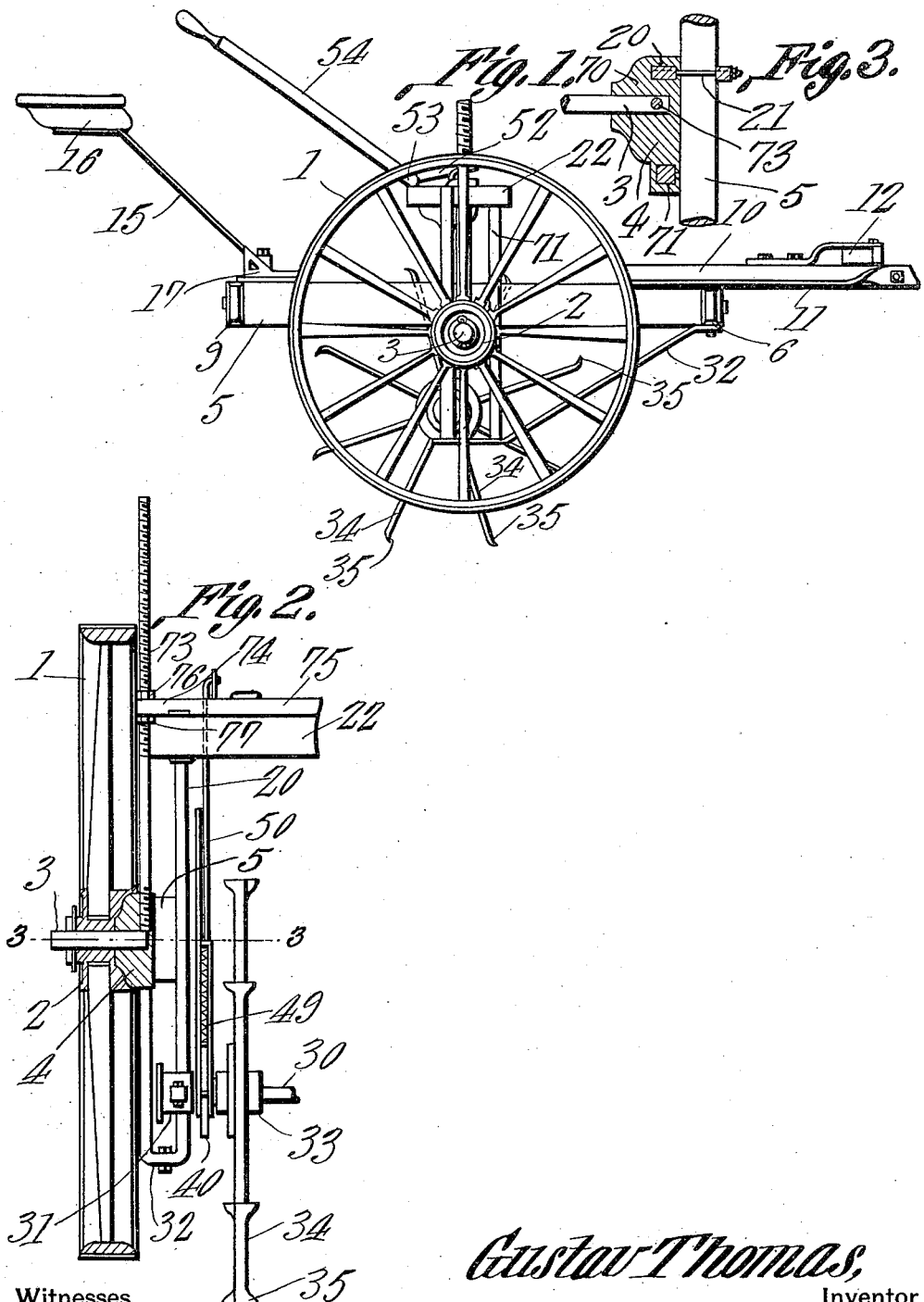

GUSTAV THOMAS, OF LIND, WASHINGTON.

WEEDER.

997,640.  Specification of Letters Patent.  Patented July 11, 1911.

Original application filed January 12, 1910, Serial No. 537,719. Divided and this application filed October 3, 1910. Serial No. 585,077.

To all whom it may concern:

Be it known that I, GUSTAV THOMAS, a citizen of the United States, residing at Lind, in the county of Adams and State of Washington, have invented a new and useful Weeder, of which the following is a specification.

This invention has relation to weeders and consists in the novel construction and arrangement of its parts hereinafter shown and described.

The object of the invention is to provide a strong, simple, durable and thoroughly efficient machine for removing weeds and for performing other cultivating operations.

In the accompanying drawings:—Figure 1 is a side elevation of the weeder. Fig. 2 is a vertical sectional view of a portion of the weeder. Fig. 3 is a horizontal section on the line 3—3 of Fig. 2.

The machine consists of a running gear and wheels and a frame supported upon the said running gear. Means are provided for raising or lowering the frame upon the running gear. Suitably connected with the frame is a ground engaging element or cutter. By raising or lowering the main frame on the running gear, it will be apparent that the ground engaging element is caused to project a greater or less distance into the soil or is raised completely out of contact therewith.

The reference numeral 1 indicates one of the wheels or running gear. These wheels are provided with the usual hubs 2 from which project stub shafts or axles 3. Each axle 3 is supported in a block 4 of any desired shape or size.

The frame of the machine consists preferably of the side bars 5 which are connected together by a cross piece 6 and a rear cross piece 9. Suitably connected with the front cross piece 6 of the frame are the tongue 10 and the tongue braces 11. Mounted on the tongue is the usual double tree 12. The rear cross piece 9 of the frame supports the stand 15 of a driver's seat 16, said stand being received in a bracket 17 suitably fastened on said cross piece 9. Bolted or otherwise suitably secured to each side bar 5 of the frame is a stirrup iron or hanger 20 which is approximately U-shaped, as shown, the bolts for securing said stirrup iron to the side pieces 5 being indicated by the numeral 21. The lower or closed portion of each stirrup iron extends some distance below the side piece 5 and the upper ends of each stirrup iron extend some distance above the said side piece 5. Extending transversely across the machine and supported on the upper ends of the stirrup irons 20 is an upper frame piece or plank 22.

The ground engaging element or cutter, which is supported by the above described frame, will now be briefly taken up. This cutter includes a non-circular shaft 30 the ends of which are suitably rounded and fit into bearings or boxes 31 bolted or otherwise fixed on the stirrup irons 20 as shown in Fig. 2. The stirrup irons 20 and the shaft 30 are made rigid by means of braces 32 which connect the lower ends of the stirrup irons 20 with the forward ends of the side pieces 5 of the frame. Mounted upon the intermediate portion of the shaft 30 are a plurality of hubs 33 in which are bolted or otherwise removably secured a plurality of radially extending cutter arms 34 carrying at their outer ends cutters 35 which may be of any desired form and character.

Means for raising and lowering the frame and ground engaging element upon the wheels, for the purpose of causing the cutters to project a greater or less distance in the soil will now be described.

As shown in Fig. 3 the axle support or block 4 is provided with a grooved cavity which partially surrounds the outer portion of the stirrup iron 20 so as to permit said stirrup iron to slide in said block. A second guide member 71 is connected at its lower end to the upper frame piece, and at its lower end to the brace 32. A rod 73 is threaded at its lower end into the block 4. The upper end of the rod 73 is threaded and projects through a perforated ear 74 in a plate 75 bolted or otherwise secured to the upper frame piece 22 at the end thereof. The rod 73 is provided above and below the ear 74 with nuts 76 and 77 by adjusting which the frame of the machine is raised or lowered upon the wheels.

It will be noted that the machine may be readily dismantled for the purpose of removing and replacing cutters and the making of changes and repairs.

The subject matter of the present invention is divided from my earlier application for weeder, filed in the Patent Office January 12, 1910, Serial No. 537,719.

Having thus described the invention what I claim as new and desire to secure by Letters Patent is:—

A weeder comprising a main frame, a supplemental frame located above the main frame, a stirrup iron attached at its ends to the supplemental frame and receiving a side bar of the main frame between its sides, a ground-engaging member attached to the stirrup iron, a guide fixed to the supplemental frame and extending parallel with the stirrup iron, a brace attached to the lower ends of the stirrup iron and guide and also connected with the main frame, a block slidably mounted between the stirrup iron and guide, means for holding said block in an adjusted position with relation to the supplemental frame, a stub shaft fixed to said block and a wheel journaled upon said shaft.

In testimony that I claim the foregoing as my own, I have hereto affixed my signature in the presence of two witnesses.

GUSTAV THOMAS.

Witnesses:
O. C. STEEN,
E. T. COPP.

Copies of this patent may be obtained for five cents each, by addressing the "Commissioner of Patents, Washington, D. C."